May 24, 1960
A. M. BRODY ET AL
2,937,617
BIRD FEEDER
Filed Feb. 25, 1958
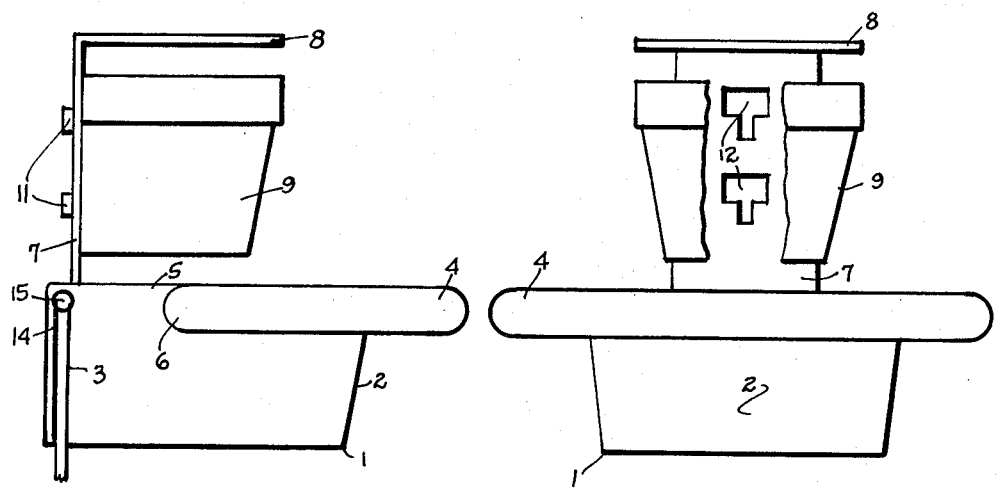
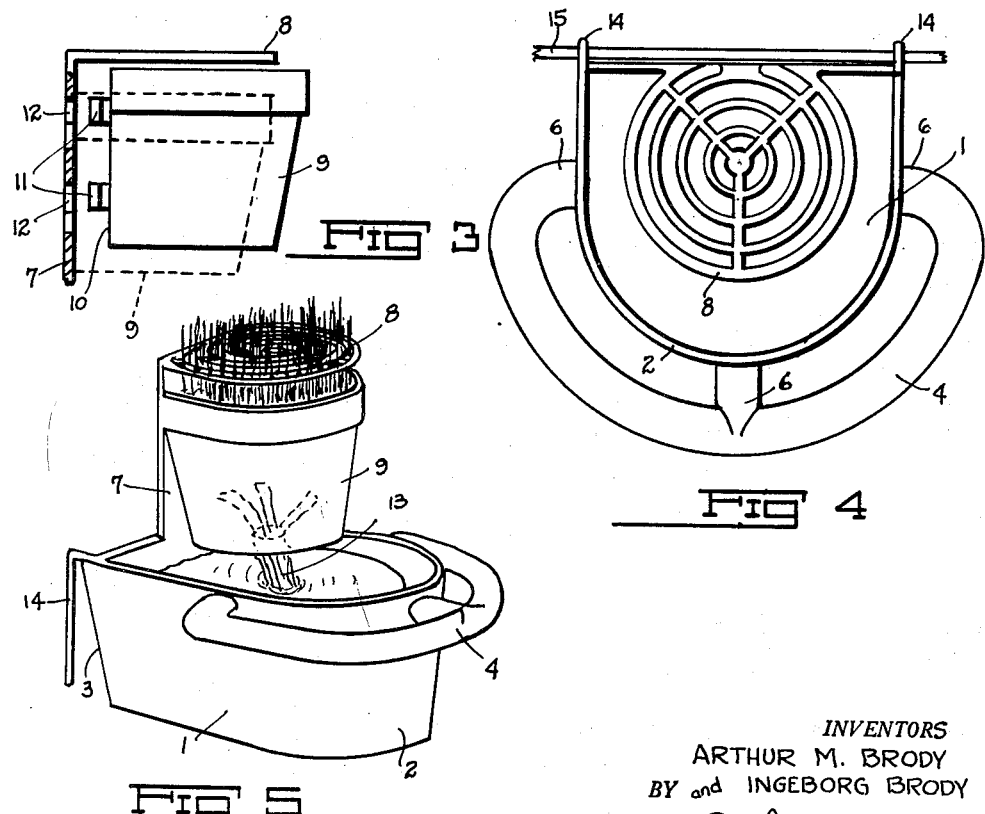
INVENTORS
ARTHUR M. BRODY
BY and INGEBORG BRODY
Charles Richard Werner
ATTORNEY

United States Patent Office 2,937,617
Patented May 24, 1960

2,937,617

BIRD FEEDER

Arthur M. Brody and Ingeborg Brody, both of 330A Higgins Road, Park Ridge, Ill.

Filed Feb. 25, 1958, Ser. No. 717,423

5 Claims. (Cl. 119—51.5)

This invention relates in general to bird feeders and in particular to a hydroponic greens feeder and drinking fountain.

It has been proven by research and personal experience that pet birds benefit greatly when greens are included in their diets. Such greens are provided by the feeding of lettuce, celery and other leafy vegetables, by grass clippings, weeds and the like when they are available. However, such greens generally wilt before they are completely eaten, much of it going to waste and causing the cage to be unsightly and unsanitary.

It is the primary object of our invention to provide a greens feeder which will have a continuous supply of greens over a period of days.

It is another object of our invention to provide a greens and water feeder wherein the greens feeder will draw its moisture from a water supply which will also serve to supply water for the bird for drinking purposes.

One more object of the invention is to provide a water supply for pet birds with a greens receptacle removably related to the water supply with means for supplying water to the receptacle.

And still another object is to provide a greens feeder for pet birds with seeds planted throughout the feeder at different levels and a perforated baffle above the feeder to deflect the greens as they emerge from the feeder and to prevent the bird from eating the short grass until it passes through the baffle.

Other objects and advantages as well as the construction and use of our invention will be apparent by reference to the following description in connection with the accompanying drawing in which:

Fig. 1 is a side elevational view of our invention.
Fig. 2 is a front elevational view of the same.
Fig. 3 is a top plan view of the invention.
Fig. 4 is a fragmentary, disassociated view of the greens container and its support.
Fig. 5 is an isometric view of the invention.

Referring now to the drawing by numerals of reference, 1 designates a water container having a semi-circular front portion 2 and flat rear wall 3. A bird perch 4 extends about the semi-circular portion of the water container, preferably on a level with the top edge 5 of said container and attached thereto at several points 6.

A vertical extension 7 is provided at the rear flat wall 3 and extending transversely therefrom over the water container and spaced therefrom we have provided a perforated baffle 8.

A greens growing receptacle or flower pot 9 is used for soil, sand or other suitable agent in which to plant seed such as rye, clover or the like. The rear surface 10 of the greens growing receptacle or pot may be flat as shown and may have several tabs 11 to fit slotted apertures 12 in the vertical extension 7. This arrangement will prevent the bird from tampering with and removing the pot 9 from its support.

A wick 13 extends from the interior of flower pot 9 and is immersed in the liquid in the water container 1 for supplying water to the soil or sand in greens growing receptacle or pot 9 by capillary action.

Suitable hooks 14 extend from the water container 1 and may hook over a bar 15 in a cage in a suitable and well known manner.

It will be seen that when in assembled position the greens growing receptacle or pot 9 is slightly below the perforated baffle 8. This is a very important feature inasmuch as the bird cannot reach the growing greens between the surface of the soil in the pot and the baffle 8 but must wait until the greens have passed through the perforations in the baffle. As long as there is seed in the soil or sand this is a continuing process, the bird being supplied with greens over a long period of time without requiring any special care or feeding. Also, the baffle will act somewhat as a shade and the greens will seek the light passing through the perforations in the baffle.

From the same perch the bird can reach the water or the greens. The water is for a dual purpose and is replenished as needed. A number of filled pots sold without the water container and greens growing receptacle or pot support will provide green food for many months. Any suitable means may be provided for covering the pots until they are ready for use.

From the foregoing it will be seen that we have provided a new and novel means for feeding greens and water to pet birds, the water being simultaneously used, by capillary action, to moisten the contents of the greens growing receptacle or pot containing the seed for the greens.

It is obvious that changes in form, proportion and minor details of construction may be resorted to without departing from the spirit of our invention and we reserve the right to such changes as come within the spirit of these specifications and the claims which follow.

What we claim as new and desire to secure by Letters Patent is:

1. In a feeding device for use in bird cages, a greens growing receptacle having top and bottom portions, a perforated baffle covering the top of the receptacle, a water container adjacent the bottom of the receptacle, a water conducting means connecting the container to the receptacle, means supporting said receptacle, container and baffle in said cage whereby greens growing in the receptacle are fed water from the water container, and said baffle preventing access to the greens until they have grown through said perforated baffle.

2. The structure as specified in claim 1, and a perch adjacent the water container and greens receptacle.

3. The structure as specified in claim 1, said greens growing receptacle being removably attached to said supporting means.

4. The structure as specified in claim 1, said perforated baffle extending transversely from the supporting means.

5. The structure as specified in claim 1, said receptacle supporting means extending upwardly from the rear of the water container.

References Cited in the file of this patent

UNITED STATES PATENTS

| 1,718,432 | Qualmann | June 25, 1929 |
| 2,081,337 | Lockyer | May 25, 1937 |
| 2,699,752 | Reyes | Jan. 18, 1955 |

FOREIGN PATENTS

| 240,410 | Switzerland | June 1, 1946 |
| 654,013 | Great Britain | May 30, 1951 |